J. H. Walker.
Horse Hay-Fork.
N° 73211    Patented Jan. 7, 1868.
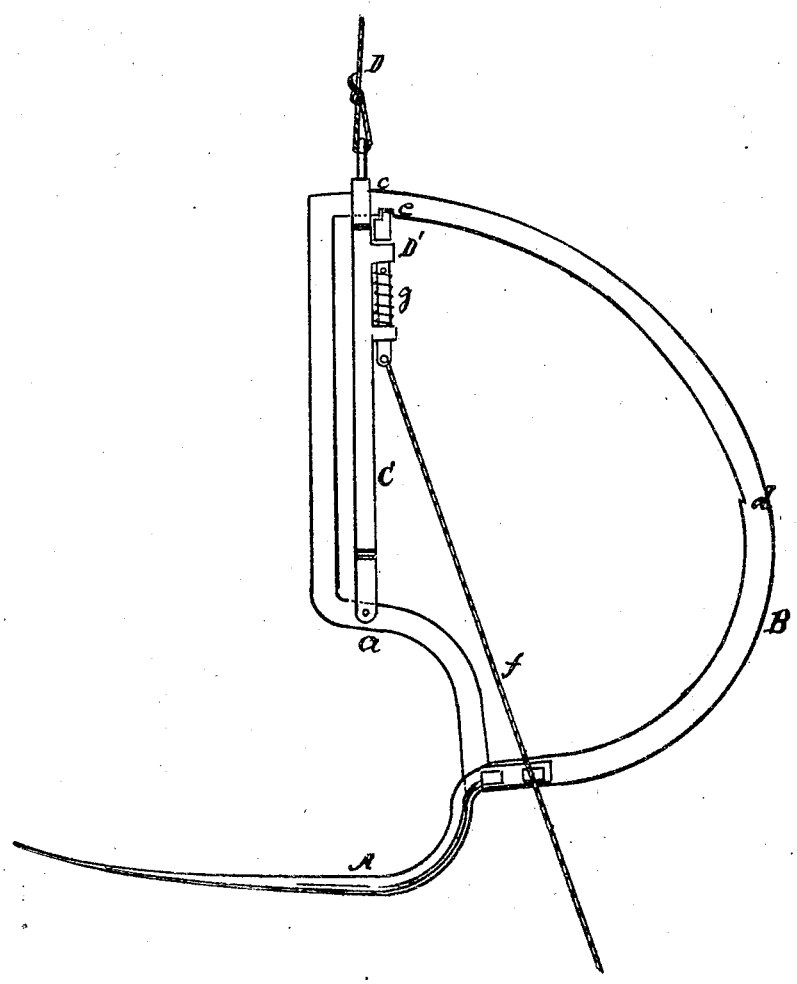
Witnesses.          Inventor.

United States Patent Office.

JOSEPH H. WALKER, OF GRAND RAPIDS, MICHIGAN.

Letters Patent No. 73,211, dated January 7, 1868.

IMPROVEMENT IN HORSE HAY-FORKS.

*The Schedule referred to in these Letters Patent and making part of the same.*

TO ALL WHOM IT MAY CONCERN:

Be it known that I, JOSEPH H. WALKER, of Grand Rapids, in the county of Kent, and State of Michigan, have invented a new and useful Improvement in Hay-Fork; and I do hereby declare that the following is a full, clear, and exact description thereof, which will enable those skilled in the art to make and use the same, reference being had to the accompanying drawings, forming part of this specification.

This invention relates to a new and useful arrangement, whereby the labor of handling hay is greatly lessened; and it consists in a fork of peculiar construction, which is attached to an irregular-shaped frame, and so arranged that the position of the fork can be varied, as will be hereinafter described.

The drawing represents a side view of the fork, with all the apparatus belonging to it attached.

A is the fork proper, of two or more tines. B is the frame to which the tines of the fork are attached. C is the suspension-bar. The load on the fork is suspended from the top of this bar by a rope or chain, D, which rope or chain is attached to some suitable point, where it passes over a pulley, so that the fork, with its load, can be elevated thereby, and then the fork lowered to the ground. The suspension-bar C is attached to the frame B by a jointed connection or pin, at $a$, and near the upper end there is a mortise, through which the rim of the frame passes, and when standing, as represented in the drawing, the fork, with its load, may be raised. To hold it in this position, there is a spring-catch, D', attached, the end of which catches into a recess in the frame, as seen at $e$, the spiral spring $g$ serving to hold it there. From this point (marked $c$,) to the point marked $d$, the frame forms the arc of a circle, with the point of connection, $a$, as its centre.

When the loaded forks have been raised, the spring-catch D' is drawn from its recess in the frame, by pulling the cord $f$, which is attached to the lower end of the catch. When the catch is withdrawn from the frame, the loaded fork drops, and at the same time the frame B slides through the mortise in the bar C, until the point $d$ is reached, when the hay readily slips from the fork.

What I claim as new, and desire to secure by Letters Patent, is—

The vertical spring-bolt D', working in projections upon the side of the suspension-bar C, near its upper end, and fitting into the notch $e$ in the under side of the curved frame B, passing through the mortise in the suspension-bar C, above the spring-bolt D', arranged and operating as described for the purpose specified.

JOSEPH H. WALKER.

Witnesses:
T. FOOTE,
H. WILLARD.